United States Patent
Kojima et al.

(10) Patent No.: US 9,584,256 B2
(45) Date of Patent: Feb. 28, 2017

(54) ADAPTIVE ERROR CORRECTION CODE FOR OPTICAL SUPER-CHANNELS

(71) Applicant: Mitsubishi Electric Research Laboratories, Inc., Cambridge, MA (US)

(72) Inventors: Keisuke Kojima, Weston, MA (US); Kieran Parsons, Cambridge, MA (US); David Millar, Somerville, MA (US); Toshiaki Koike-Akino, Malden, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 383 days.

(21) Appl. No.: 14/299,458

(22) Filed: Jun. 9, 2014

(65) Prior Publication Data
US 2016/0204899 A1 Jul. 14, 2016

(51) Int. Cl.
*H03M 13/00* (2006.01)
*H04L 1/00* (2006.01)
(Continued)

(52) U.S. Cl.
CPC ..... *H04L 1/0041* (2013.01); *H04B 10/07953* (2013.01); *H04J 14/02* (2013.01); *H04J 14/0257* (2013.01); *H04J 14/0298* (2013.01); *H04L 1/0009* (2013.01); *H04L 1/0045* (2013.01); *H04J 2203/0076* (2013.01)

(58) Field of Classification Search
CPC ..... H04L 1/0041; H04J 14/0298; H04J 14/02; H04B 10/07953
See application file for complete search history.

(56) References Cited

U.S. PATENT DOCUMENTS 7,930,616 B2 4/2011 Gerstel et al.
8,290,070 B2 10/2012 Guerrieri et al.
(Continued)

OTHER PUBLICATIONS

Lei et al. "Adaptive Modulation and Code Rate for Turbo Coded OFDM Transmissions," IEEEVTS Vehicular Technology Conference, Proceedings, IEEE, US. Apr. 1, 2007, pp. 2702-2706. XP031093121, ISBN: 978-1-4244-0266-3.
(Continued)

*Primary Examiner* — Sam Rizk
(74) *Attorney, Agent, or Firm* — Gene Vinokur; James McAleenan; Hironori Tsukamoto

(57) ABSTRACT

A method for transmitting data over an optical super-channel partitions the data unequally into a set of data streams for transmission over the set of sub-channels of the super-channel, such that a size of a first data stream for transmission over a first sub-channel is different than a size of a second data stream of the data for transmission over a second sub-channel. The method encodes each data stream of the data with an error correction code (ECC) having different ECC rates to produce a set of encoded data streams and transmits concurrently the set of encoded data streams over the set of sub-channels of the super-channel. Accordingly, the method uses an adaptive ECC for optical super-channels, such that a first ECC rate for encoding the first data stream is different than a second ECC rate for encoding the second data stream.

18 Claims, 6 Drawing Sheets

(51) Int. Cl.
  *H04J 14/02* (2006.01)
  *H04B 10/079* (2013.01)

(56) References Cited

U.S. PATENT DOCUMENTS

2012/0082459 A1    4/2012  Wu et al.
2016/0164626 A1*   6/2016  Cavaliere .............. H04L 1/0006
                                                            398/183

OTHER PUBLICATIONS

Qi et al. "Joint Adaptive Code Rate Technique and Bit Interleaver for Direct-Detection Optical OFDM System," Optical Fiber Technology, vol. 19, No. 1, Jan. 1, 2013, pp. 35-39, CP055205709.
Yue-Kai et al. "Terabit/s Optical Superchannel with Flexible Modulation Format for Dynamic Distance/Route Transmission," Optical Fiber Communication Conference and Exposition, 2012 and the National Fiber Optic Engineers Conference, IEEE, Mar. 4, 2012, pp. 1-3, XP032340527.
Liu et al. "1.5-Tbs/s Guard Banded Superchannel Transmission over 56x 100-km (5600-km) ULAF Using 30-Gbaud Pilot-free OFDM-16QAM Signals with 5.75-b/s/Hz Net Spectral Efficiency." ECOC Postdeadline Papers 2012 OSA. Th.3.c.5.

\* cited by examiner

ADAPTIVE ERROR CORRECTION CODE FOR OPTICAL SUPER-CHANNELS

FIELD OF THE INVENTION

This invention relates generally to coherent optical communications systems, and more particularly to transmitting data over an optical super-channel.

BACKGROUND OF THE INVENTION

Coherent optical communications enable data to be transmitted over long haul (typically >2,000 kin) optical transmission networks at higher data rates. A coherent detector requires that the received phase modulated optical signal is digitized for a digital signal processor (DSP). Digitizing the received signal requires a high speed analog-to-digital converter (ADC). However, an increase in serial ADC sampling rates is difficult to implement for single-wavelength coherent detection at data rates greater than 100 Gbit/s.

A super-channel is an evolution in dense wavelength division multiplexing (DWDM) in which multiple coherent optical carriers are combined on a single super-channel at a higher data rate, and is brought into service in a single operational cycle. Rather than a single wavelength channel of, e.g., 100 Gbit/s, a super-channel a multi-wavelength signal in which each wavelength operates as a sub-channel at the maximum data rate permitted by ADC components.

One notable difference between the super-channel and conventional wavelength division multiplexing (WDM) is a size of a gap between frequencies of different sub-channels. The super-channel can decrease the size of the gap between wavelengths of the sub-channels, but the transmitted data is handled uniformly, i.e., each super-channel is handled like a single wide channel, in terms of adding, dropping, and routing data. Various techniques can be used to reduce the sub-channels gap to the MHz range. These techniques include orthogonal-band-multiplexed (OBM), orthogonal frequency division multiplexing (OFDM), no guard interval (NGI)-OFDM, Nyquist WDM, and multi-channel equalization (MCE)-WDM.

However, the small size of the gap between frequencies of different sub-channels cause nonlinearity of noise in the sub-channels, i.e., each sub-channel receives different nonlinearity-induced phase noise causing non uniformity in the bit-error-ratio (BER) across the sub-channels. One solution to this problem is to increase the transmission power over the sub-channels experiencing higher noise. However, the increase of the transmission power for one channel also changes the nonlinearity-induced distortion of other channels. Therefore, it is difficult to adjust the power levels of all the sub-channels in the same fiber to meet the BER requirements.

Accordingly, there is a need for a system and a method for transmitting data over an optical super-channel formed by a set of sub-channels in a single fiber such that the transmission over all the sub-channels meets the BER requirements.

SUMMARY OF THE INVENTION

Usually, the data transmitted over a super-channel is partitioned, i.e., distributed, equally among all sub-channels of the super-channel. For example, to transmit the data at 400 Gigabit per second (Gb/s) over the super-channel having four sub-channels, the data are partitioned into four equal portions of 100 Gb/s, and each portion is transmitted on one sub-channel.

Some embodiments of the invention are based on a realization that the data transmitted over the super-channel can be partitioned unequally into a set of data streams for transmission over the sub-channels. Usually, the bit rate and the size of the data transmitted over the entire super-channel are fixed. However, according to the embodiments, only the coded bit rates are fixed for the sub-channels, and the size of the uncoded data streams can vary for different sub-channels as long as the sum of the data transmitted over all sub-channels equals the fixed data transmitted over the super-channel.

Various embodiments use this realization to vary rates of the error correction code (ECC) adaptively among different sub-channels to compensate for the non-linear noise. For example, in some embodiments, a sub-channel with higher noise transmits less data and more ECC than another sub-channel with lower noise. In such a manner, the receiver of super-channel transmission receives more redundant data transmitted over more noisy sub-channels and can use this redundancy in the ECC procedure.

Additionally or alternatively, some embodiments allow for the transmission of a super-channel over several non-adjacent wavelengths in a point-to-point link, to improve performance over optical channels where the noise and distortion power spectrum are not flat.

In various embodiments, the FEC rate is varied among the sub-channels such that transmission over all the sub-channels meets the BER requirements. In some embodiments, the total amount of data transmitted over each sub-channel is fixed and include the data to be transmitted plus the redundant data of the FEC. In alternative embodiments, the amount of data transmitted over each sub-channel varies.

Accordingly, one embodiment discloses a method for transmitting data from a transmitter to a receiver over an optical super-channel. The method includes partitioning the data unequally into a set of data streams for transmission over the set of sub-channels of the super-channel, such that a size of a first data stream for transmission over a first sub-channel is different than a size of a second data stream of the data for transmission over a second sub-channel; encoding each data stream of the data with an error correction code (ECC) having different ECC rates to produce a set of encoded data streams, such that a first ECC rate for encoding the first data stream is different than a second ECC rate for encoding the second data stream; and transmitting concurrently the set of encoded data streams over the set of sub-channels of the super-channel.

Another embodiment discloses a transmitter for transmitting data to a receiver over an optical super-channel formed by a set of sub-channels of different wavelengths including a data de-multiplexer for partitioning the data unequally into a set of data streams for transmission over the set of sub-channels of the super-channel, such that a size of a first data stream for transmission over a first sub-channel is different than a size of a second data stream of the data for transmission over a second sub-channel; a set of forward error correction (FEC) encoders for encoding each data stream of the data with an error correction code (ECC) having different ECC rates to produce a set of encoded data streams, such that a first ECC rate for encoding the first data stream is different than a second ECC rate for encoding the second data stream; and a multiplexer for multiplexing the set of encoded data streams for coherent transmission over the set of sub-channels of the super-channel.

Yet another embodiment discloses a system for transmitting data over an optical super-channel formed by a set of sub-channels of different wavelengths including a transmitter for partitioning and encoding the data into a set of data streams having different uncoded data rate and for transmitting the set of data streams over the set of sub-channels; and a receiver for decoding and combining the set of data streams to recover the data.

DETAILED DESCRIPTION OF THE PREFERRED EMBODIMENT

Figure 1A:
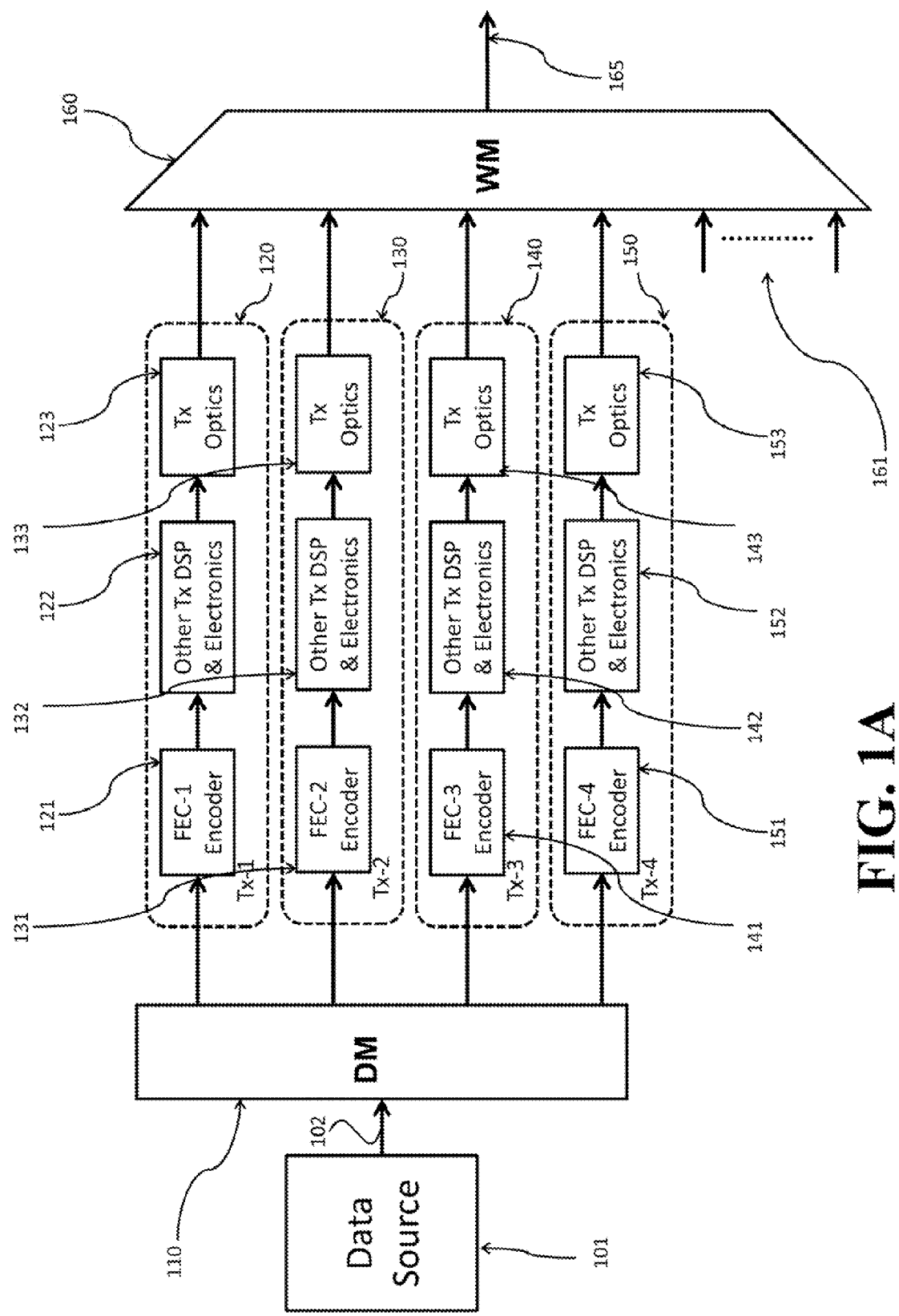
FIG. 1A is a block diagram of a super-channel transmitter for transmitting data to a receiver over an optical super-channel according to some embodiments of an invention.
Figure 1B:
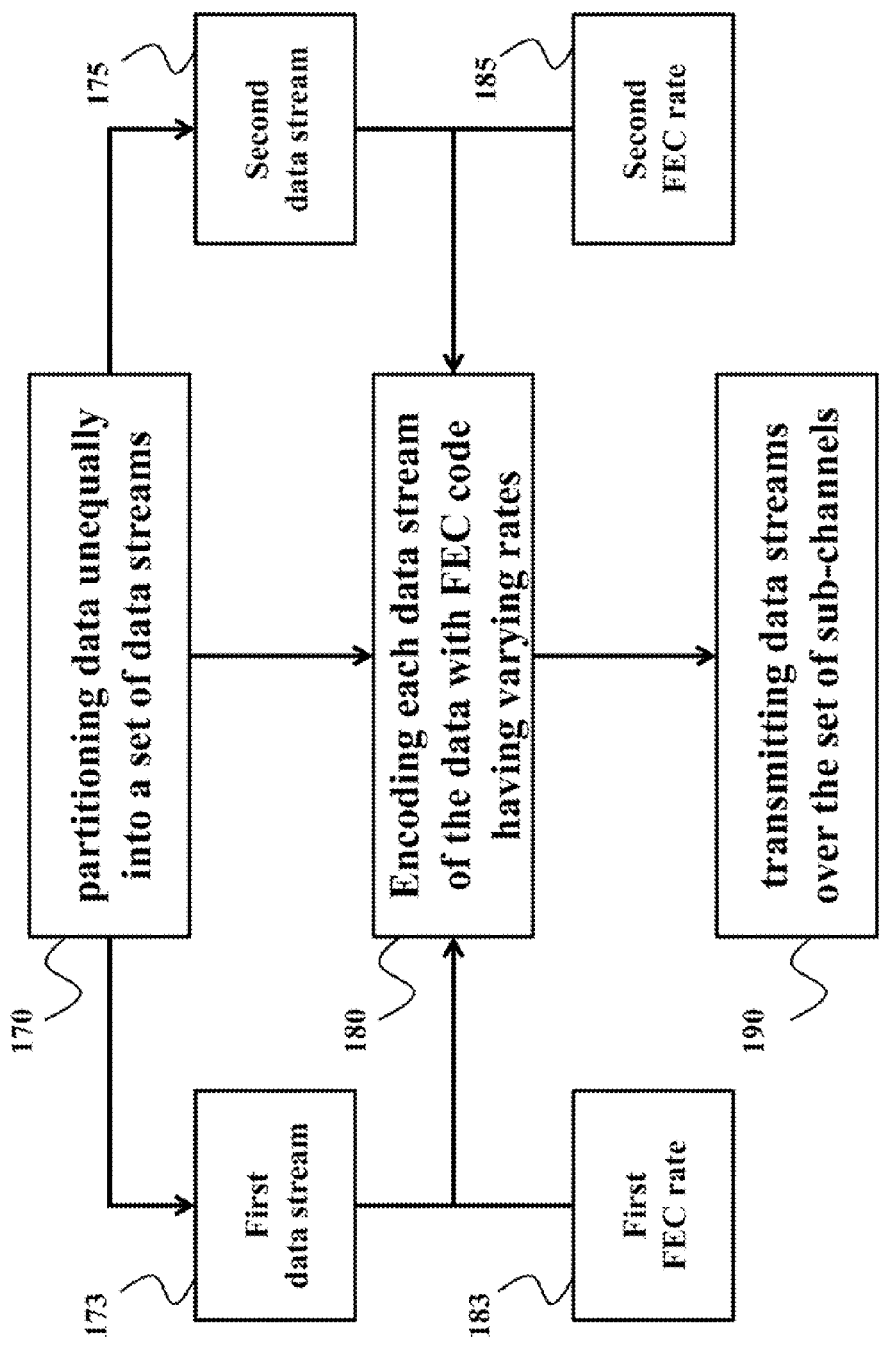
FIG. 1B is a flow chart of a method for transmitting the data that can be implemented by the super-channel transmitter of FIG. 1A.

FIG. 1A shows a block diagram of a super-channel transmitter for transmitting data to a receiver over an optical super-channel formed by a set of sub-channels of different wavelengths. FIG. 1B shows a flow chart of a method for transmitting the data that can be implemented by the super-channel transmitter of FIG. 1A.

Some embodiments of the invention are based on a realization that the data transmitted over the super-channel can be partitioned unequally into a set of data streams for transmission over the sub-channels. Usually, the bit rate and the size of the data transmitted over the entire super-channel are fixed. However, according to the embodiments, only the bit rates are fixed for the sub-channels, and the size of the transmitted data streams can vary for different sub-channels as long as the sum of the data transmitted over all sub-channels equals the fixed data transmitted over the super-channel.

According to various embodiments of the invention, the super-channel transmitter partitions and encodes the data into a set of data streams having different uncoded data rate and transmits the set of data streams over the set of sub-channels to a receiver that decodes and combines the set of data streams to recover the data.

For example, the super-channel transmitter includes several sub-channels transmitters 120, 130, 140, 150 for transmitting different data streams of different size and with different coding schemes to achieve similar coded performance per sub-channel with similar coded bit rate and/or bandwidth per sub-channel. The data streams of the data for different sub-channels are multiplexed, in the optical domain, using a wavelength multiplexer (WM) 160, possibly with other independent wavelengths 161, before transmission over the optical channel 165.

For example, the super-channel transmitter includes a data de-multiplexer (DDM) 110 for receiving uncoded data 102 from a data source 101. An example of the DDM 110 is a binary data de-multiplexer receiving data at a fixed rate, e.g. 416 Gb/s. The de-multiplexer 110 partitions 170 the data unequally into a set of data streams for transmission over the set of sub-channels of the super-channel, such that a size of a first data stream 173 for transmission over a first sub-channel is different than a size of a second data stream 175 for transmission over a second sub-channel. For example, the data de-multiplexer produces multiple binary data streams with unequal bit-rates, e.g. 104, 104, 120, 88 Gb/s. In some embodiments, the size of each data stream is different. In alternative embodiments, the sizes of some data stream can be equal. The number of binary data streams corresponds to the number of wavelength sub-channels used by the transmitter, and can be any number greater than one.

The set of data streams is encoded 180 by a set of forward error correction (FEC) encoders, e.g., encoders 121, 131, 141, 151. The set of FEC encoders encodes the set of data stream with an error correction code (ECC) having different ECC rates to produce a set of encoded data streams. For example, each data stream is encoded such that the first FEC rate 183 for the first data stream is different than the second FEC rate 185 for the second data stream. In some embodiments, the encoding is performed such that the performance after decoding is equal over all sub-channels, regardless of varying channel conditions for the individual sub-carriers. For example, one embodiment varies the FEC code rates among different sub-channels and/or data stream, such that a bit error ratio (BER) for each sub-channel is less than a threshold.

After the encoding, the sub-carriers can have different or the same data rate, e.g. 125, 125, 125, 125 Gb/s, resulting in several subcarriers, i.e., one per each sub-channel, that have equal bandwidth and/or coded data rates, but different uncoded data rates. The coded data streams are then sent to electronic and/or electrical pre-processing on a per sub-carrier basis 122, 132, 142, 152 before being sent to the transmitter optics 123, 133, 143, 153, e.g. transmitter optical sub-assembly (TOSA), modulator, for transmission 190.

Figure 2:
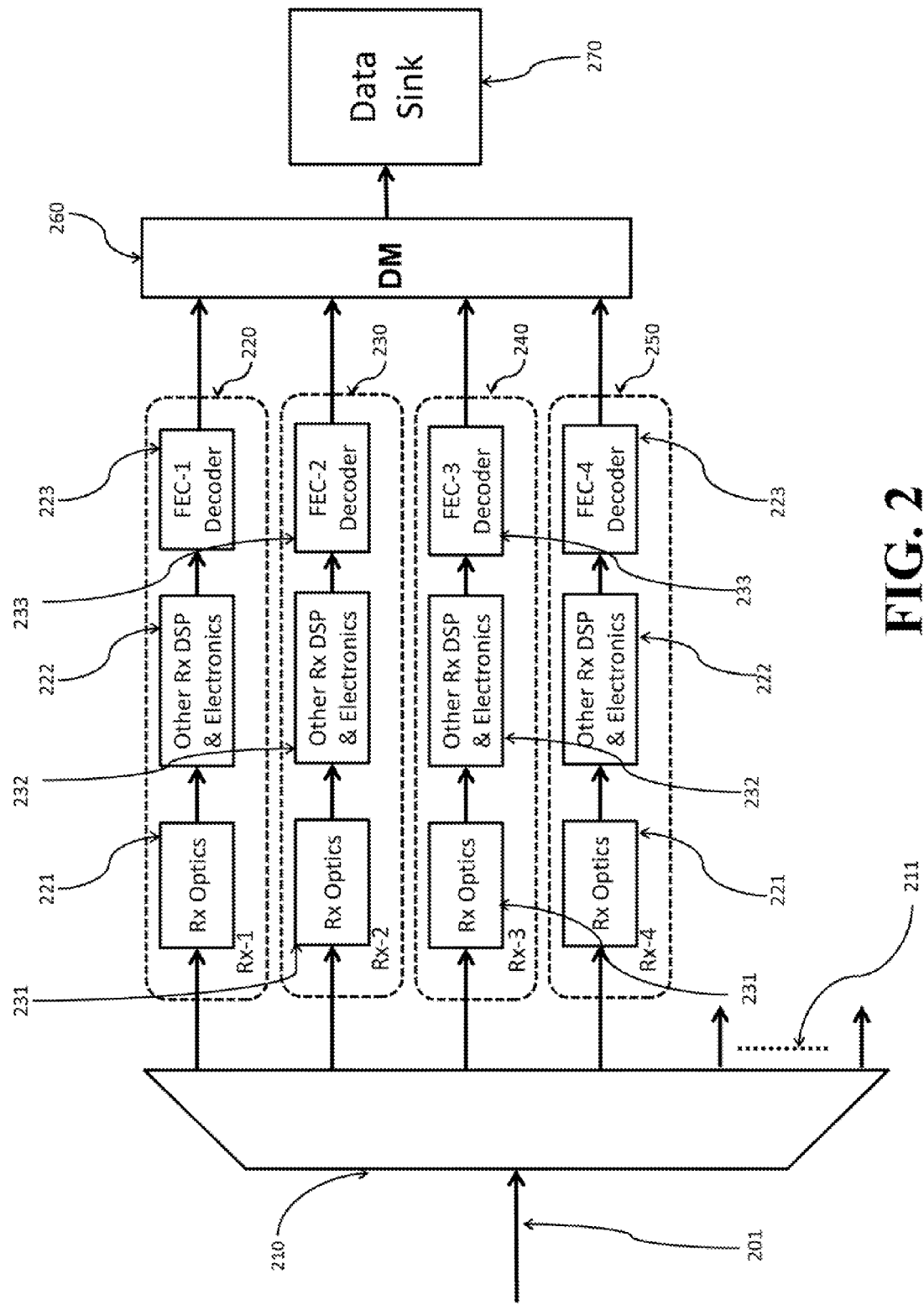
FIG. 2 is a block diagram of a super-channel receiver according to some embodiments of the invention.

FIG. 2 shows a block diagram of a super-channel receiver according to some embodiments of the invention. The signal 201 received from the optical channel 165 is de-multiplexed by a wavelength de-multiplexer (WDM) 210 into several wavelength subcarriers. Some of these wavelengths subcarriers 211 can be unrelated to the super-channel transmission. Each of the wavelength subcarriers of the super-channel, i.e., one per each sub-channel, is then sent to a corresponding sub-channel receiver 220, 230, 240, or 250. The sub-channel receivers can include an optical front end 221, 231, 241, 251 followed by an electrical and electronic processing module 222, 232, 242, or 252 to aid recovery of transmitted data streams. The individual subcarriers are then sent to a set of decoders for decoding each encoded data stream 223, 233, 243, 253 that for producing decoded data streams with different data rates. The decoded data streams are then combined by a data multiplexer (DM) 260 to reproduce 270 the original data 102.

Figure 3:
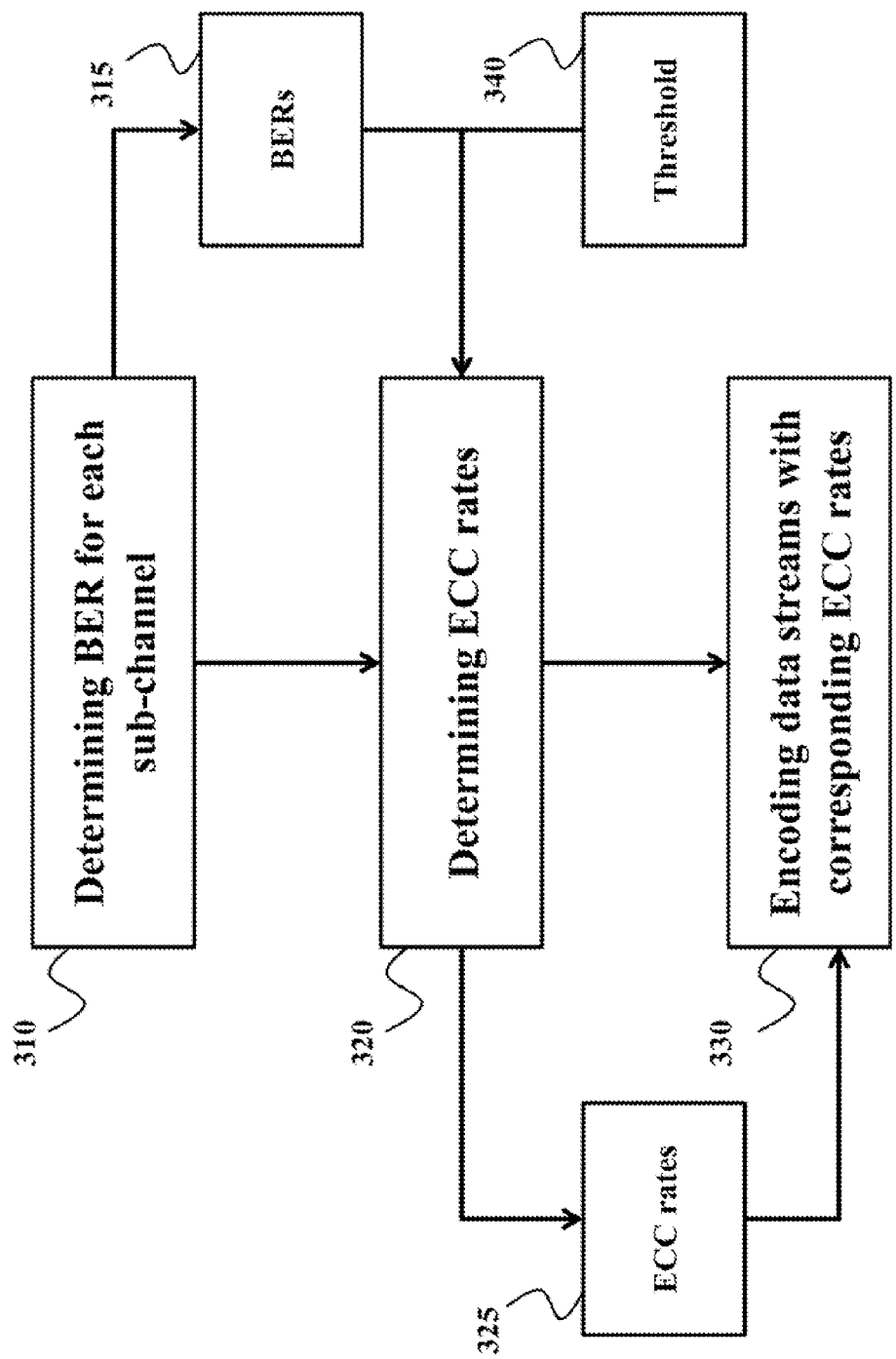
FIG. 3 is a block diagram for determining ECC rate for encoding different data streams according to some embodiments of the invention.

FIG. 3 shows a block diagram for determining ECC rate for encoding different data streams according to various embodiments of the invention. For example, some embodiments determine 320 the ECC rates 325 such that values 315 of a bit error ratio (BER) of the transmission over the sub-channels of the super-channel are less than a threshold 340. In some embodiments, the ECC rates 325 are determined 320 for each sub-channel, such that the values of the BER for transmitting the decoded data streams over different sub-channels are substantially equal. Specifically, the BER represents the signal-to-noise quality of each sub-channel. Some embodiments increase the ECC rate for noisy sub-channels to achieve the desired value of the BER. Alternative embodiment controls the ECC data rates and powers to achieve the longest reach of fiver transmissions, where the BER for each sub-channel is not necessarily balanced over all sub-channels. In such a manner, different values of the ECC rates 325 are used for encoding 330 the data streams.

For example, some embodiments determine 310 values 315 of the BER for transmitting packets of equal sizes over the set of sub-channels; and determine sizes of the data streams for the transmission over the set of sub-channels according to the distribution. Different embodiments determine a distribution of values of the BER analytically or based on initial BER measurements determined during an initialization of the optical super-channel.

Figure 4:
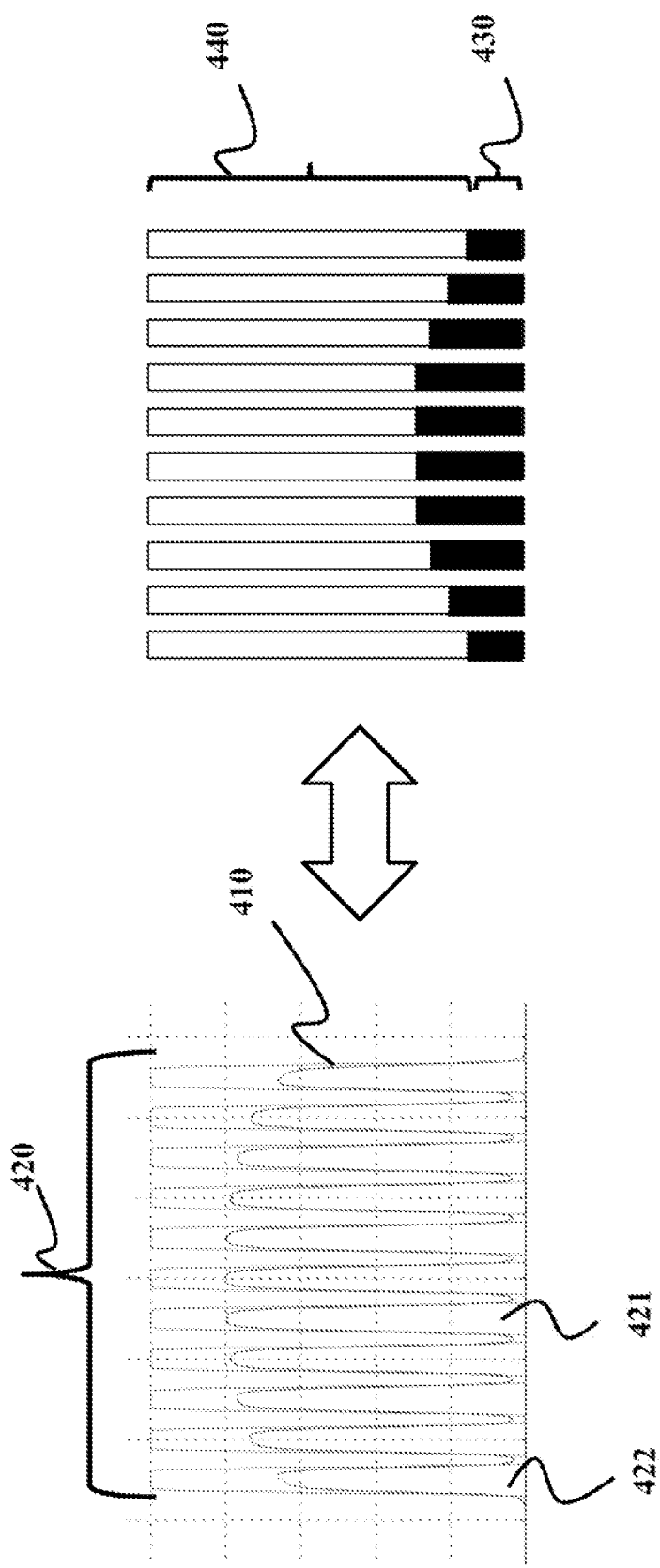
FIG. 4 is a schematic of non-linear distribution of values of the BER according to some embodiments of the invention.

FIG. 4 shows a schematic of non-linear distribution 410 of values of the BER 410 for transmitting packets of equal sizes over the set of sub-channels 420. Some embodiments are based on a realization that the distribution of the values of the BER is related to nonlinearity-induced distortion caused, e.g., by interference on the sub-channels 420. For example, the noise on a sub-channel 421 closer to a center of a frequency band of the super-channel is greater than a noise on a sub-channel 422 that is closer to the boarder for the frequency band.

Some embodiments determine sizes of the uncoded data streams 440 and/or the sizes of ECC 430 for the transmission over the set of sub-channels according to the distribution 410. For example, one embodiment determines the sizes of the data streams for the transmission over the set of sub-channels proportionally to the distribution, such that a BER ratio between the first value of the BER for the first sub-channel and the second value of the BER for the second sub-channel equals a data ratio between the size of the first data stream and the size of the second data stream. Using this proportionality test, the exact ECC rates and/or the size of the uncoded data streams for each sub-channel can be determined based on the transmission rate of the data and a number of the sub-channels.

Figure 5:
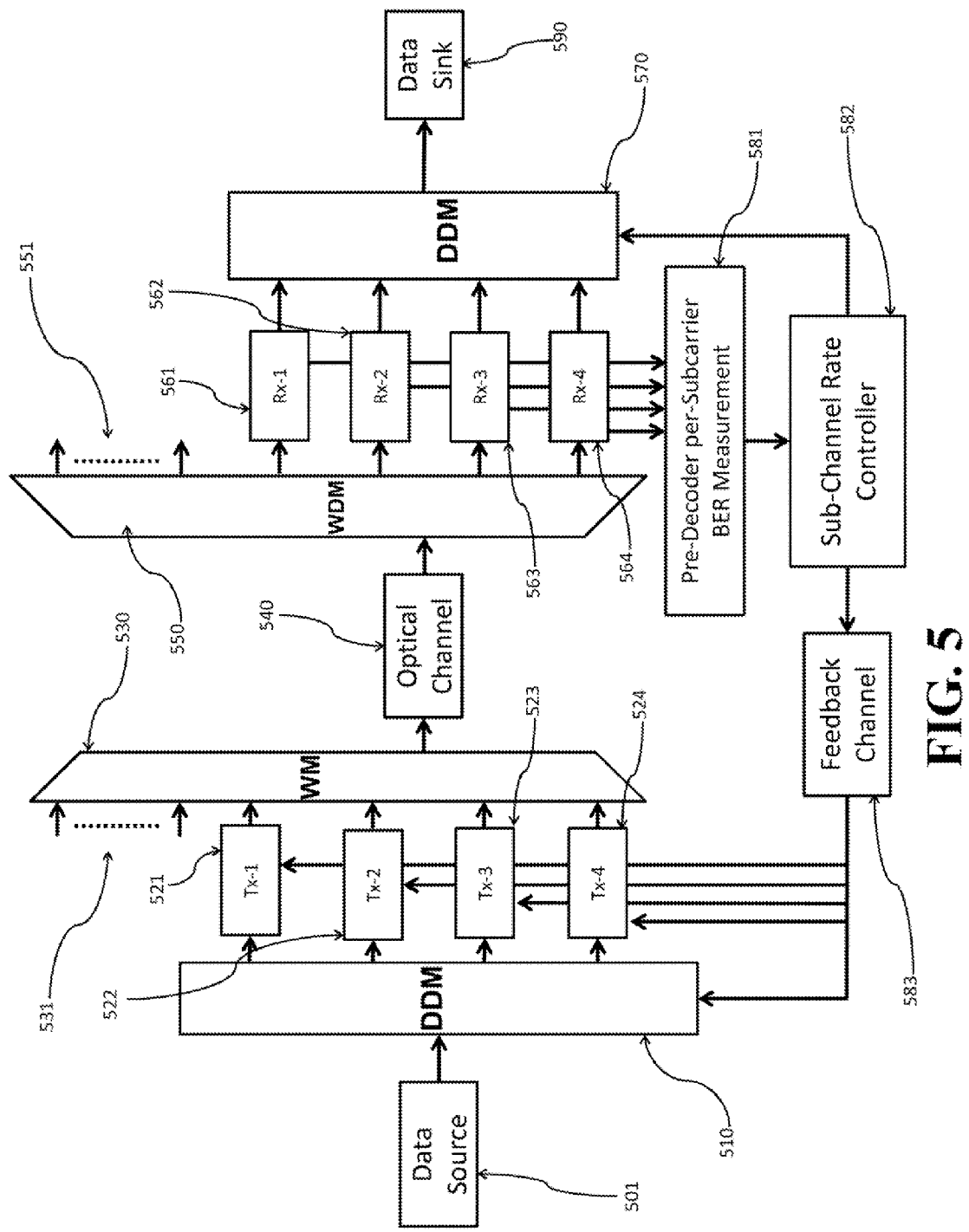
FIG. 5 is a block diagram of a system for transmitting data over an optical super-channel formed by a set of sub-channels of different wavelengths according to some embodiments of the invention.

FIG. 5 shows a block diagram of a system for transmitting data over an optical super-channel formed by a set of sub-channels of different wavelengths. The system includes a transmitter for partitioning and encoding the data into a set of data streams having different uncoded data rates and for transmitting the set of data streams over the set of sub-channels and a receiver for decoding and combining the set of data streams to recover the data according to one embodiment of the invention.

In this embodiment, the uncoded data 501 are transmitted at a fixed rate to the digital data de-multiplexer (DDM) 510, which partitions the data into several unequal data streams, with an overall data rate equal to the input data. A set of sub-channels transmitters 521, 522, 523, 524, with variable coding capability, is used to generate the sub-carriers, which are then multiplexed together by a wavelength multiplexer (WM) 530, optionally with other unrelated wavelengths 531. The optical signals are then transmitted over the optical channel 540.

At the receiver, the optical signal is partitioned into its component wavelengths by a wavelength de-multiplexer (WDM) 550, optionally including other unrelated wavelengths 551. Each component sub-carrier is sent to a corresponding receiver 561, 562, 563, 564 including a variable code rate decoder. The binary outputs of the component subcarriers (of varying digital data rates) are sent to a digital data multiplexer (DDM) 570 to be recombined 590 at the original data rate used in submitting the data 501.

This embodiment can also include components for determining values of the BER determined during an initialization of the optical super-channel. For example, during the initialization of the optical channel 540, each subcarrier performs BER estimation after transceiver bootstrapping. For example, a BER measurement module 581 determines the values of the BER for each sub-channel during the L2/L3/L4 initialization procedure. A sub-channel rate controller 582 receives these BER measurements, and determines the ECC rates for each sub-channel. This rate information is sent to the digital data de-multiplexer 510, variable rate encoders in the sub-carrier transmitters 521, 522, 523, 524, the variable rate decoders in the sub-carrier receivers 561, 562, 563, 564. In some embodiments, the rate information is in the control plane rather than the data plane, and is distributed over a feedback channel 583 which is physically distinct from the forward optical channel 540. Some controller modules of embodiments of the invention are implemented using a processor.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A method for transmitting data from a transmitter to a receiver over an optical super-channel, comprising:
    partitioning the data unequally into a set of data streams for transmission over the set of sub-channels of the super-channel, such that a bit-rate of a first data stream for transmission over a first sub-channel is different than a bit-rate of a second data stream of the data for transmission over a second sub-channel;
    encoding each data stream of the data with an error correction code (ECC) having different ECC rates to produce a set of encoded data streams, such that a first ECC rate for encoding the first data stream to produce a first encoded data stream is different than a second ECC rate for encoding the second data stream to produce a second encoded data stream, wherein a bit-rate of the first encoded data stream equals a bit-rate of the second encoded data stream, or the bandwidth of the first sub-channel equals the bandwidth of the second sub-channel, or both; and
    transmitting concurrently the set of encoded data streams over the set of sub-channels of the super-channel.

2. The method of claim 1, wherein the encoding comprises:
    determining the ECC rates such that values of a bit error ratio (BER) of the transmission over the sub-channels of the super-channel are less than a threshold.

3. The method of claim 2, further comprising:
    determining the ECC rates for each sub-channel, such that the values of the BER for transmitting the decoded data streams over different sub-channels are substantially equal.

4. The method of claim 2, further comprising:
    determining initial values of the BER of the sub-channels during an initialization of the optical super-channel; and
    determining bit-rates of the data streams and corresponding ECC rates according to the initial values of the BER.

5. The method of claim 1, wherein the partitioning comprises:

determining distribution of values of a bit error ratio (BER) for transmitting data streams of equal sizes over the set of sub-channels; and determining bit-rates of the data streams for the transmission over the set of sub-channels according to the distribution.

6. The method of claim 5, further comprising:

determining the bit-rates of the data streams for the transmission over the set of sub-channels proportionally to the distribution, such that a BER ratio between a first value of the BER for the first sub-channel and a second value of the BER for a second sub-channel equals a data ratio between the bit-rate of a first data stream and the bit-rate of the second data stream.

7. The method of claim 1, further comprising:

receiving the set of encoded data streams; and decoding each encoded data stream with different encoders for producing decoded data streams with different data rates; and combining the decoded data streams to recover the data.

8. A transmitter for transmitting data to a receiver over an optical super-channel formed by a set of sub-channels of different wavelengths, comprising:

a data de-multiplexer for partitioning the data unequally into a set of data streams for transmission over the set of sub-channels of the super-channel, such that a bit-rate of a first data stream for transmission over a first sub-channel is different than a bit-rate of a second data stream of the data for transmission over a second sub-channel;

a set of forward error correction (FEC) encoders for encoding each data stream of the data with an error correction code (ECC) having different ECC rates to produce a set of encoded data streams, such that a first ECC rate for encoding the first data stream to produce a first encoded data stream is different than a second ECC rate for encoding the second data stream to produce a second encoded data stream, wherein, after the encoding, a bit-rate of the first data encoded stream equals a bit-rate of the second encoded data stream;

a set of transmitter optics for modulating the set of encoded data streams in an optical domain; and a multiplexer for multiplexing the set of encoded data streams in the optical domain for coherent transmission over the set of sub-channels of the super-channel.

9. The transmitter of claim 8, wherein the data de-multiplexer determines the ECC rates such that values of a bit error ratio (BER) of the transmission over the sub-channels of the super-channel are less than a threshold.

10. The transmitter of claim 8, wherein the data de-multiplexer determines the ECC rates according to a distribution of values of a bit error ratio (BER) for transmitting the data streams of equal bit-rates over the set of sub-channels.

11. The transmitter of claim 10, wherein the data de-multiplexer determines the bit-rates of the data streams for the transmission over the set of sub-channels proportionally to the distribution, such that a BER ratio between a first value of the BER for the first sub-channel and a second value of the BER for the second sub-channel equals a data ratio between the bit-rate of the first data stream and the bit-rate of the second data stream.

12. The transmitter of claim 10, wherein the data de-multiplexer receives the values of the BER determined during an initialization of the optical super-channel.

13. A system for transmitting data over an optical super-channel formed by a set of sub-channels of different wavelengths, comprising:

a transmitter for partitioning and encoding the data into a set of data streams having different uncoded data rates, but equal coded data rates and/or equal bandwidths of the sub-channels, and for transmitting the set of data streams over the set of sub-channels, wherein the transmitter comprises:

a data de-multiplexer for partitioning the data unequally into the set of data streams, such that a bit-rate of a first data stream for transmission over a first sub-channel is different than a bit-rate of a second data stream of the data for transmission over a second sub-channel;

a set of sub-channels transmitters, wherein each sub-channel transmitter includes a forward error correction (FEC) encoder, for encoding each data stream of the data with an error correction code (ECC) having different ECC rates to produce a set of encoded data streams, such that a first ECC rate for encoding the first data stream to produce a first encoded data stream is different than a second ECC rate for encoding the second data stream to produce a second encoded data stream, wherein a bit-rate of the first encoded data stream equals a bit-rate of the second encoded data stream, or the bandwidth of the first sub-channel equals the bandwidth of the second sub-channel, or both; and a wavelength multiplexer for multiplexing the set of encoded data streams for coherent transmission over the set of sub-channels of the super-channel; and a receiver for decoding and combining the set of data streams to recover the data.

14. The system of claim 13, wherein the data de-multiplexer determines the ECC rates such that values of a bit error ratio (BER) of the transmission over the sub-channels of the super-channel are less than a threshold.

15. The system of claim 13, wherein the receiver comprises:

a de-multiplexer for receiving the set of encoded data streams; and a set of decoders for decoding each encoded data stream for producing decoded data streams with different data rates; and a data multiplexer for combining the decoded data streams to determine the data.

16. The system of claim 15, wherein the receiver further comprises:

a BER measurement module for determining values of the BER for each sub-channel during an initialization of the optical super-channel; and a sub-channel rate controller for determining the ECC rates for the sub-channels and for transmitting the ECC rates to the transmitter over a feedback channel.

17. The system of claim 13, wherein the transmitter transmits the set of data streams with an identical transmission power for each sub-channel.

18. The system of claim 13, wherein the transmitter transmits the set of data streams with non-uniform transmission power.

* * * * *